United States Patent
Jindal et al.

(10) Patent No.: US 11,665,110 B1
(45) Date of Patent: May 30, 2023

(54) USING DISTRIBUTED SERVICES TO CONTINUE OR FAIL REQUESTS BASED ON DETERMINING ALLOTTED TIME AND PROCESSING TIME

(71) Applicant: Amazon Technologies, Inc., Seattle, WA (US)

(72) Inventors: Himanshu Jindal, Seattle, WA (US); Christoph Saalfeld, Seattle, WA (US); Saurabh Chatterjee, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/588,808

(22) Filed: Sep. 30, 2019

(51) Int. Cl.
| | |
|---|---|
| *G06F 15/173* | (2006.01) |
| *H04L 47/70* | (2022.01) |
| *H04L 47/74* | (2022.01) |
| *H04L 47/78* | (2022.01) |
| *H04L 67/51* | (2022.01) |

(52) U.S. Cl.
CPC .......... *H04L 47/826* (2013.01); *H04L 47/746* (2013.01); *H04L 47/781* (2013.01); *H04L 47/823* (2013.01); *H04L 67/51* (2022.05)

(58) Field of Classification Search
CPC ... H04L 47/826; H04L 47/746; H04L 47/781; H04L 47/823; H04L 67/16
USPC ........................ 709/223, 225, 226, 228, 229
See application file for complete search history.

(56) References Cited

U.S. PATENT DOCUMENTS

| | | | | |
|---|---|---|---|---|
| 6,141,759 | A * | 10/2000 | Braddy ................. | G06F 9/5044 709/203 |
| 9,697,152 | B1 * | 7/2017 | Riedy ................... | G06F 13/122 |
| 2009/0172674 | A1 * | 7/2009 | Bobak ................. | G06F 11/1482 718/101 |
| 2015/0332331 | A1 * | 11/2015 | Sura ................... | G06Q 30/0267 705/14.61 |
| 2016/0360497 | A1 * | 12/2016 | Maruyama ........... | H04L 65/608 |
| 2019/0028555 | A1 * | 1/2019 | Du ........................ | H04L 67/32 |
| 2019/0075207 | A1 * | 3/2019 | Kitaguchi ........... | H04N 1/0009 |

\* cited by examiner

*Primary Examiner* — Liang Che A Wang
(74) *Attorney, Agent, or Firm* — Robert C. Kowert; Kowert, Hood, Munyon, Rankin & Goetzel, P.C.

(57) ABSTRACT

After a service receives a request from another service, the service determines an amount of time to process the request by the service as well as a remaining time allotment to complete processing the request (e.g., a timeout value). Based on the remaining time allotment and the amount of time to process the request by at least the service (predicted time or actual time), the service may determine whether to continue processing the request (e.g., by the service and/or one or more subsequent services) or fail the request. In response, the service may then continue processing the request (e.g., continue processing at the service itself or propagate the request to the next service), or the service may fail the request.

20 Claims, 7 Drawing Sheets

USING DISTRIBUTED SERVICES TO CONTINUE OR FAIL REQUESTS BASED ON DETERMINING ALLOTTED TIME AND PROCESSING TIME

BACKGROUND

The Internet of Things (IoT) is a phrase given for the interconnection of computing devices scattered around the globe within the existing internet infrastructure. IoT devices may be used for a variety of consumer and industrial applications. For example, a voice-activated device may process voice commands and perform various actions based on the commands, or a device may use global positioning system (GPS) data to display a current location of a user.

The various computing systems that connect IoT devices and process communication for the IoT devices may be highly distributed. As a result, a considerable latency may be introduced during communication associated with IoT devices (e.g., the processing of a command). In some cases, a delay may be introduced by the continued processing of a command, even if the results of the processing are no longer needed or desired. This may result in tying up valuable computing resources that would otherwise be available to process requests from other IoT devices or other sources.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

The systems and methods described herein implement techniques for continuing or failing requests based on determinations of allotted time and processing time. In embodiments, a provider network may implement multiple services that may be distributed across one or more systems and/or subsystems of the provider network. In various embodiments, a request received from a client (e.g., from an IoT device of a client network or a device of the provider network) may be propagated through multiple different services of the provider network (and in some cases through one or more services of the client's network and/or third-party networks) for processing until the processing of the request is complete.

In embodiments, when a particular service receives a request (e.g., propagated from another service), the service may determine a remaining time allotment to complete processing of the request (e.g., a timeout value). In embodiments, the remaining time allotment is the maximum amount of time available for the request to complete processing (e.g., provide a response and/or a result based on the processing), after which the request may fail (e.g., result in a timeout failure) because the request has not completed processing (e.g., provide a response and/or a result based on the processing). The service may also determine an amount of time to process the request by at least the service. For example, the service may predict an amount of time to process the request by the service (and one or more subsequent services), or the service may determine the amount of time it actually took for the service to process the request (and predict an amount of time to process the request by one or more subsequent services).

Based on the remaining time allotment and the amount of time to process the request by at least the service (predicted time or actual time), the service may determine whether to continue processing the request (e.g., by the service and/or one or more subsequent services) or fail the request (depending on whether there is enough time to complete processing within the remaining time allotment). In response, the service may then continue processing the request (e.g., continue processing at the service itself or propagate the request to the next service), or the service may fail the request. In embodiments, the service may or may not return a timeout failure response if the service fails the request. Embodiments allow a client device to send re-try requests at a faster rate and therefore improve the response time for re-tries. For example, a client device may receive a failure response much sooner and therefore send a re-try request sooner. Embodiments may accomplish this by failing a request quickly instead of sending the request to additional services further down the call stack before eventually failing the request. By failing the request without further processing of the request, the submitter of the request (e.g., a client device) may retry the request sooner than would be possible if the request were further processed.

In some embodiments, a "first stage" of the service may predict an amount of time to process the request by the service and/or one or more subsequent services and a "second stage" of the service may determine the amount of time it actually took for the service to process the request. At the first stage (before the service actually begins processing the request or at some point during processing of the request by the service), the service may determine whether to continue processing the request by the service or fail the request, based on the remaining time allotment and the predicted time for the service and/or one or more subsequent services to complete processing the request. For example, if the service determines that the predicted time to complete processing of the request is within (or equal to) the remaining time allotment, then the service determines to continue processing the request. Otherwise, the service fails the request.

If the request continues processing at the first stage, then after the service completes processing the request (or completes at least a portion of processing of the request), the second stage may determine the actual amount of time the service took to process the request (or at least partially process the request) and reduce the remaining time allotment by at least the actual amount of time the service took. The service may then determine whether to continue processing the request or fail the request, based on the updated remaining time allotment and the predicted time for the one or more subsequent services to complete processing the request. For example, if the service determines that predicted time is within (or equal to) the remaining time allotment, then the service determines to continue processing the request. Otherwise, the service fails the request. In an embodiment, if the service determines that the remaining time allotment is zero or too small (e.g., the request has timed out, or the time allotment is smaller than a pre-configured threshold amount of time), then the service fails the request.

In various embodiments, zero or more services that process a particular request may perform only the first stage to determine whether to continue or fail the request, zero or more other services that process the particular request may perform only the second stage to determine whether to continue or fail the request, and/or zero or more other services that process the particular request may perform both the first and second stage to determine whether to continue or fail the request. In embodiments, all services that process a request may perform either the first, second, or both stages (e.g., depending on a value of a global configuration parameter, a type of the request (e.g., database read, write, update, etc.), a source of the request (e.g., a type of the client device or a state of the client device that makes the request), and/or a target of the request (e.g., a type of the client device or a state of the client device that is a target of the request)).

In some embodiments, each service that processes a request may perform either the first, second, or both stages (e.g., depending on a value of a local configuration parameter for the particular service, a type of the request, a source of the request, and/or a target of the request). In embodiments, the global configuration parameter and/or the local configuration parameters may be specified in a user account, included in the request, or be default values. Therefore, different parameters, types of requests, types of source/target devices, and/or states of source/target devices may cause a service to perform first stage only, the second stage only, and/or both the first and second stage to determine whether to continue processing or fail a given request.

In various embodiments, a request may return partial results. For example, in response to determining that a time allotment for a request has expired, a service may determine whether to return partial results of the processing of the request (if the service determines that there are any partial results). In embodiments, the global configuration parameter and/or the local configuration parameter for the request may indicate whether any partial results are to be returned. If so, then the service returns the partial result(s). If not, then the service fails the request without returning any processing results (the service may or may not return a response indicating that indicates the request failed).

In some embodiments, the services that process a request may span across a provider network, a client network, and/or one or more third-party networks. Therefore, at one or more different points during processing of a request for a client, the request may be propagated between services of the provider network and client network, provider network and third-party network, client network and third-party network and/or between two third-party networks. During processing of the request (e.g., from initially generating and transmitting the request until completion of the request), one, some, or all of the services of each network may perform some or all of the techniques described herein for continuing or failing requests based on determinations of allotted time and processing time.

In embodiments, although one or more services that process a request may be located outside of the provider network (e.g., client network or third-party network), the amount of time remaining to complete processing of the request may be accurately updated and/or tracked. Therefore, in embodiments, the request may continue processing or may fail within the provider network, client network, or a third-party network.

In some embodiments, a model may be used to generate a prediction (e.g., a prediction of an amount of time to process a request by a service and/or one or more other services). As used herein, a model may be any data processing model suitable for processing input data to generate a prediction/result. For example, a model may include a neural network, deep neural network, static or dynamic neural network, a memory network, and/or any other model architecture suitable for processing input data (e.g., from sensors) and generating one or more results/predictions. Thus, in embodiments, a model may include any computational model, machine learning model, or artificial intelligence model suitable for processing data and generating one or more results. Moreover different models may include different model architectures and/or be trained based on the same or different training data.

In various embodiments, any suitable security communication protocols may be used to protect data that is being sent between any devices and/or services (e.g., IoT devices, services, etc.) and between devices of different networks (e.g., client networks, provider networks). For example, data may be encrypted using SSL (secure socket layer), TLS (transport layer security), HTTPS (secure hypertext transfer protocol), and/or any other suitable network security protocol.

Figure 1:
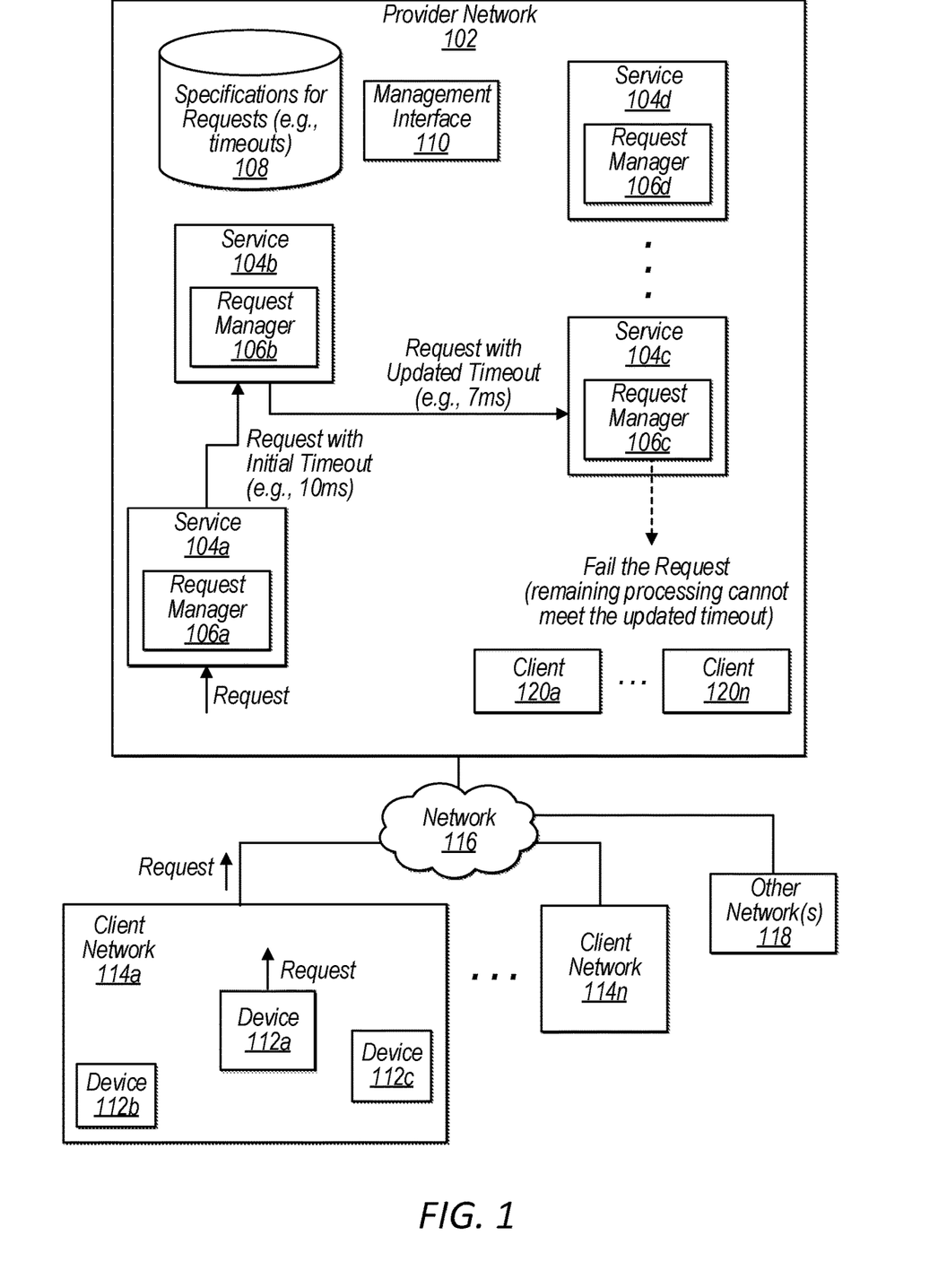
FIG. 1 illustrates a system for continuing or failing requests based on determinations of allotted time and processing time, according to some embodiments.

FIG. 1 illustrates a system for continuing or failing requests based on determinations of allotted time and processing time, according to some embodiments. A provider network 102, and any other components depicted in FIG. 1 may be the same as or include one or more of the same components as the provider network and any other components discussed in any of FIGS. 2-7, in embodiments. In various embodiments, the provider network and any other components discussed in any one of FIGS. 1-7 may be the same component as (e.g., same type of component) or include one or more of the same components as the provider network and any other components discussed in any other one of FIGS. 1-7.

In the depicted embodiment, provider network 102 includes multiple services 104 that each include a request manager 106 to perform any of the functions and/or determinations associated with a request as described herein (e.g., process, receive, propagate, and/or fail the request). As shown, the provider network 102 also includes a data store of specifications 108 for requests and a management interface 110.

In embodiments, a user or administrator may access (e.g., via an application programming interface) the management interface 110 either locally or from a remote client network (e.g., via a user/admin computing device) to configure operation of one or more of the services 104 (e.g., by entering specifications that affect how request managers process different types of requests).

In the depicted embodiments, devices 112 on a client network 114 (and/or any number of stand-alone client devices that are not part of a local network, such as a smart phone) may communicate with the provider network 102 (and any services or other components of the provider network) by transmitting data via a wide-area network 116 (e.g., the internet). Thus, the provider network 102 may be considered a remote provider network with respect to the client networks/devices and may be in another physical location than the client client networks/devices (e.g., another building, city, state, or country).

As depicted, devices of any number of client networks 114 (e.g., corresponding to different clients of the provider network) and/or devices of other networks 118 may communicate with the provider network via the network 116. In embodiments, any number of clients 120 (e.g., devices or services) within the provider network may also communicate with and/or use any of the services 104 of the provider network, as described herein for remote devices of the client network.

As shown, a device 112a of the client network 114a sends a request to the service 104a. In embodiments, the device may be any type of device (e.g., IoT device) of the client network that is capable of sending a request for processing by services 104. For example, the device 112a may be a computer of a database administrator and the request may be a request to read and/or write data to a database service hosted by the provider network. As another example, the device 112a may be a voice-activated device and the request may be a command triggered by a user's voice to perform an action (e.g., begin playing a song on a local device).

In embodiments, the service 104a (e.g., the request manager 106a) may receive the request from the device 112a, determine an initial time allotment to complete processing of the request, and then propagate the request to another service 104b. In embodiments, the request may include a timeout value based on the initial time allotment. For example, the timeout value may indicate the initial time allotment to complete processing of the request (or the timeout value may be slightly smaller due to subtracting some time used by the service 104a to process the request).

In some embodiments, instead of a timeout value, the request may instead include a timestamp that indicates when processing of the request began and a maximum time allotment to complete processing of the request. In embodiments, the request may instead include a future time as the latest time to complete processing of the request. If either of the above methods are used, then in order for a given service to determine a remaining time allotment to complete processing of the request, the service may calculate the remaining time allotment based on the timestamp/maximum time allotment or the future time as well as the current time. In such embodiments, it may be necessary for the some or all of the services to be synchronized or approximately synchronized to a global clock or use another mechanism so that different services in synch with each other.

In the depicted embodiment, the service propagates the request with an initial timeout value of 10 milliseconds (ms). In embodiments, the service 104b may determine a remaining time allotment to complete processing of the request (e.g., based on the timeout value), determine an amount of time to process the request by at least the current service (e.g., before and/or after processing the request) and determine, based on the remaining time allotment and the amount of time to process the request, whether to continue processing the request or fail the request.

As shown, the service 104b determines to continue processing the request. For example, the service 104b may reduce the remaining time allotment based on the amount of time used by the service 104b to process the request and determine that 7 ms is a sufficient amount of time for any remaining services to complete processing of the request. Therefore, the service 104b propagates the request to the service 104c.

As depicted, the service 104c determines, based on a remaining time allotment (e.g., 7 ms or another reduced timeout value) and the amount of time to process the request by at least the service (e.g., predicted or actual), to fail the request. As described herein, the determination to fail to request may be made at a first state (before the service actually processes the request) or at a second stage (after the service processes the request and updated the timeout value).

By failing out the request, embodiments reduce latency that may be associated with continued processing of a request when results of the request are no longer needed. For example, a GPS device may be capable of skipping over some requests for position on a map while still providing a readable position. Furthermore, embodiments may prevent unnecessary usage of computing and networking resources by failing out a request because services further down the call stack will no longer be called to process the request. Therefore, the requesting client device may send re-try requests at a faster rate and improve the response time for re-tries (e.g., by failing the initial request quickly instead of sending the initial request to additional services further down the call stack before failing the request).

Figure 2:
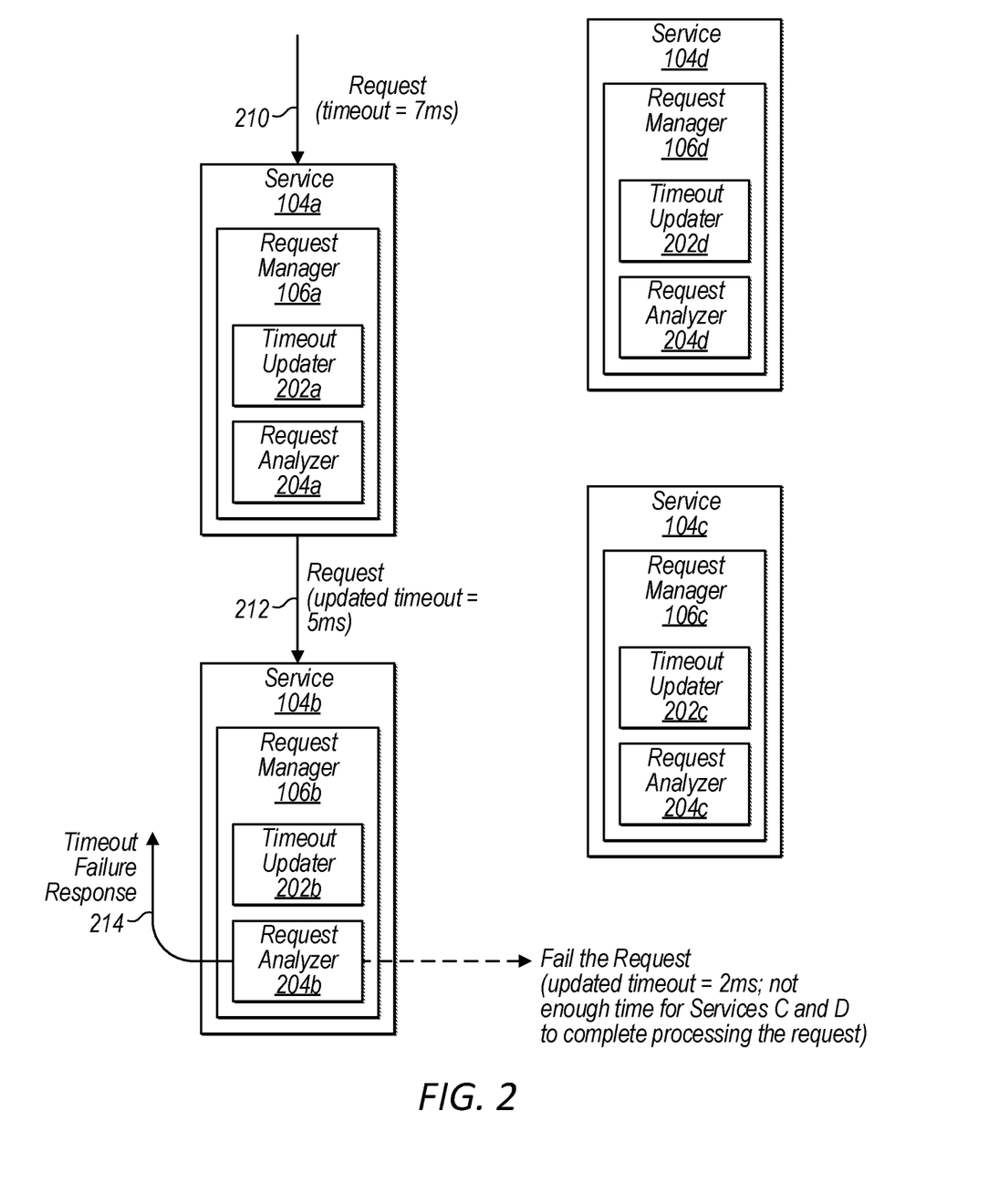
FIG. 2 illustrates an example of failing a request based on a determination of allotted time and processing time, according to some embodiments.

FIG. 2 illustrates an example of failing a request based on a determination of allotted time and processing time, according to some embodiments. As shown, the request manager 106a for each service 104 includes a timeout updater 202 and a request analyzer 204.

In the depicted embodiment, service 104a receives a request that includes a timeout value of 7 ms. Service 104a updates the timeout value to 5 ms (e.g., using timeout updater 202a) and determines (e.g., using request analyzer 204a) that 5 ms is sufficient time to complete processing of the request by one or more subsequent services (e.g., service 104b, service 104c, and service 104d). Therefore, service 104a propagates the request to service 104b.

As shown, service 104b updates the timeout value to 2 ms and determines that 2 ms is insufficient time to complete processing of the request by one or more subsequent services (e.g., service 104c and service 104d). Therefore, service 104b fails the request. As shown, the service 104b transmits a timeout failure response back to the service 104a and/or to a device that originally sent the request to the provider network. In some embodiments, the service 104b does not transmit a timeout failure response the service 104a or any other target (e.g., for a GPS-based applications).

In the depicted embodiment, service 104c and service 104d are prevented from needlessly processing the request because service 104b determined there was insufficient time to complete processing of the request within the updated timeout (2 ms). Therefore, services 104c and 104d do not waste additional computing or networking resources to continue processing the request. Furthermore, services 104c and 104d are more available to processes other requests since the request was failed at service 104b.

Figure 3:
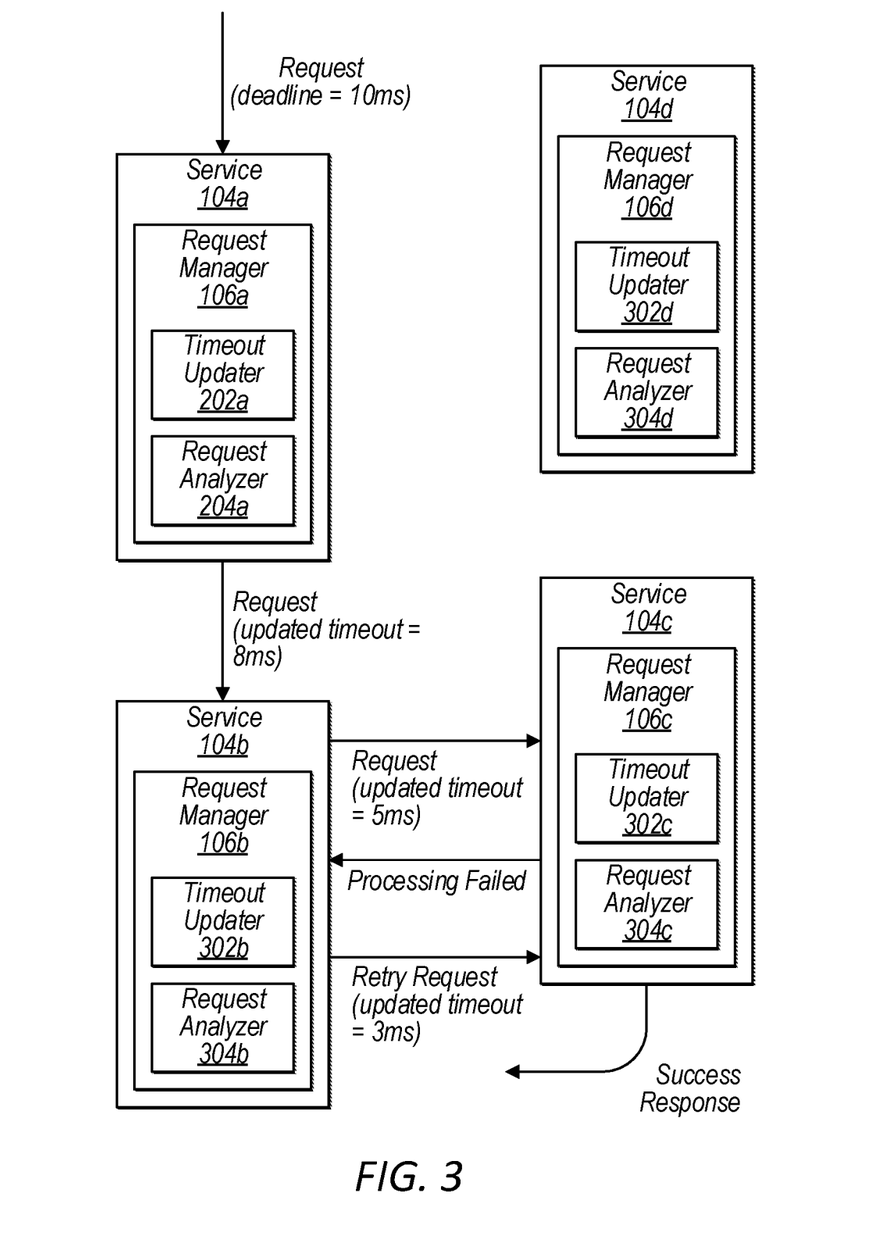
FIG. 3 illustrates an example of continuing a request and retrying a request based on a determination of allotted time and processing time, according to some embodiments.

FIG. 3 illustrates an example of continuing a request and retrying a request based on a determination of allotted time and processing time, according to some embodiments. As shown, the request manager 106a for each service 104 includes a timeout updater 202 and a request analyzer 204.

In the depicted embodiment, service 104a receives a request that includes a timeout value of 10 ms. Service 104a updates the timeout value to 8 ms (e.g., using timeout updater 202a) and determines (e.g., using request analyzer 204a) that 8 ms is sufficient time to complete processing of the request by one or more subsequent services (e.g., service 104b, service 104c, and service 104d). Therefore, service 104a propagates the request to service 104b.

As shown, service 104b updates the timeout value to 5 ms and determines that 5 ms is sufficient time to complete processing of the request by one or more subsequent services (e.g., service 104c). Therefore, service 104b propagates the request to service 104c. As shown, processing of the request by service 104c fails for a reason other than timing out. As depicted, the service 104c sends a response message (including an updated timeout value of 4 ms) back to service 104b that indicates the processing of the request failed at service 104c.

Service 104b then updates the timeout value to 3 ms and determines that 3 ms is sufficient time to complete processing of the request by one or more subsequent services (e.g., service 104c). Therefore, service 104b propagates the request as a retry request to service 104c. In some embodiments, if service 104b determines that 3 ms is insufficient time to complete processing of the request by one or more subsequent services (e.g., service 104c), then service 104b fails the request.

As depicted, service 104c completes processing of the request within the time indicated by the timeout value (3 ms). Therefore, service 104c returns a success response to service 104b and/or to a device that originally sent the request to the provider network. In some embodiments, the service 104b does not transmit a success response the service 104b or any other target (e.g., for a GPS-based applications). By allowing service 104b to retry the request to service 104c any number of times (as long as the processing can be completed within the timeout value), the client device may avoid having to retry the request. This may save time and reduce latency to responding to requests, which results in faster execution of various applications and an improved user experience.

Figure 4:
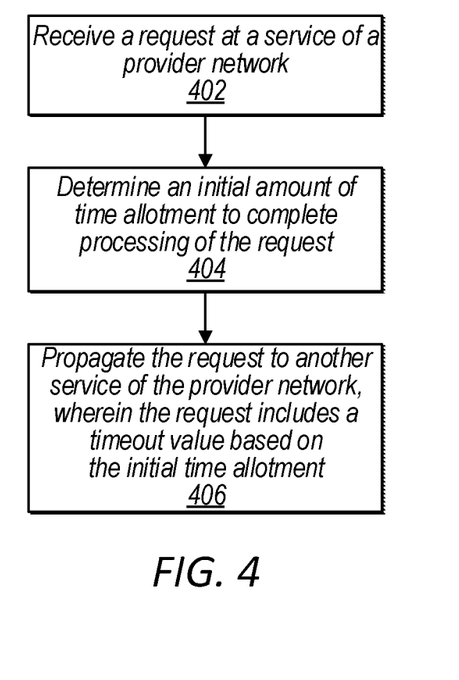
FIG. 4 is a flow diagram that illustrates initializing a timeout value and including the timeout value in a request, according to some embodiments.

FIG. 4 is a flow diagram that illustrates initializing a timeout value and including the timeout value in a request, according to some embodiments.

At block 402, a service of a provider network receives a request. For example, the service may be a gateway service and/or initial service to begin processing a request received from a client device. At block 404, the service determines an initial time allotment to complete processing of the request.

In various embodiments, any suitable technique may be used to determine the initial time allotment to complete processing of the request. For example, the service may determine different initial time allotments to complete processing of different requests based on a configuration parameter specified for a user account (e.g., a user/admin sets a default initial time allotment to complete processing request from one or more client devices), a configuration parameter included in the request (e.g., the parameter specifying the initial time allotment), a type of the request (e.g., type of application the request is for—database, GPS, lower-latency application, higher-latency application), a source of the request (e.g., one or more particular client devices/applications or types of client devices/applications that specify the initial time allotment), and/or a target of the request (e.g., one or more particular devices/applications or types of devices/applications that specify the initial time allotment).

At block 406, the service propagates the request to another service of the provider network, wherein the request includes a timeout value based on the initial time allotment. As described herein, in some embodiments the request may instead include a timestamp/maximum time allotment or a future time. In some embodiments, a client/client device may specify a longer initial time allotment, in order to allow backend services more time to process the request. For example, the number of backend services may be a relatively small (e.g., due to under-scaling of services). The client/client device may reduce the initial time allotment when the backend services require less time to process a given request (e.g., when the services are scaled up and are no longer under-scaled).

Figure 5:
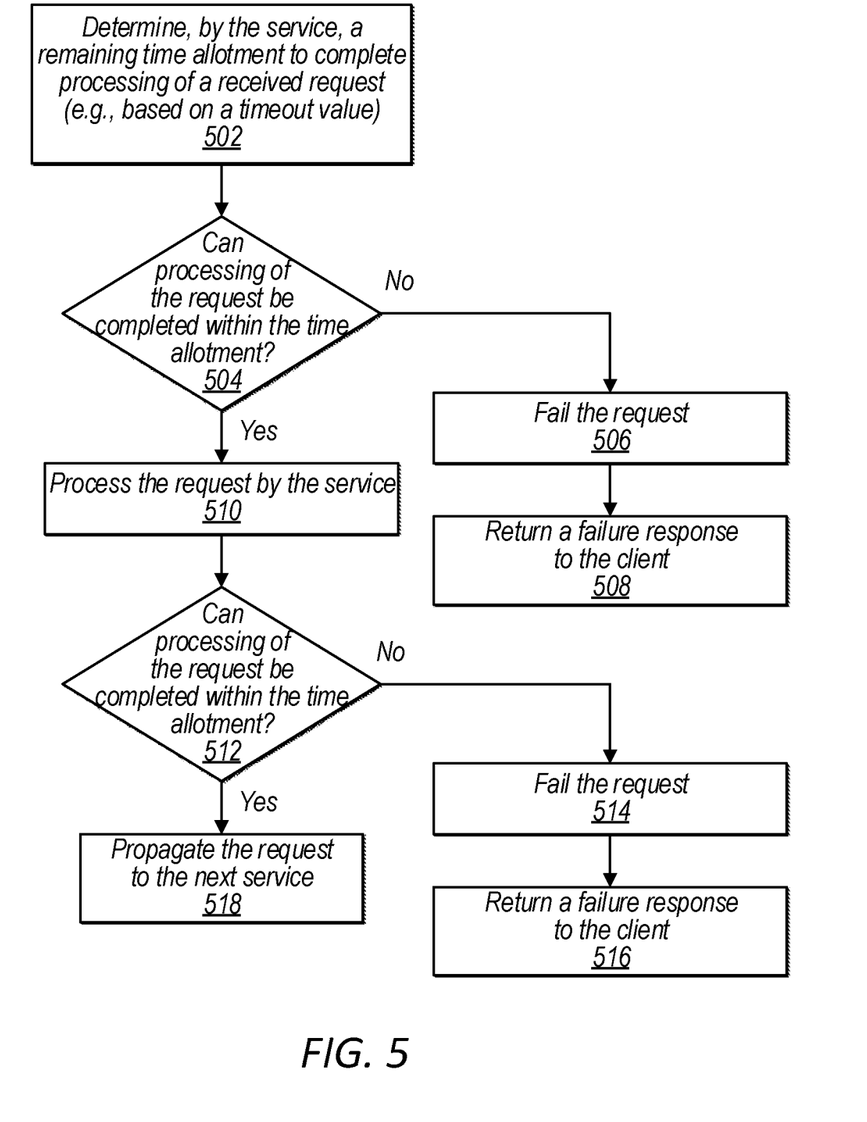
FIG. 5 is a flow diagram that illustrates continuing or failing requests based on determinations of allotted time and processing time at different stages of request processing at a service, according to some embodiments.

FIG. 5 is a flow diagram that illustrates continuing or failing requests based on determinations of allotted time and processing time at different stages of request processing at a service, according to some embodiments. At block 502, a service determines a remaining time allotment to complete processing of a received request (e.g., based on a timeout value of the request).

At block 504, the service determines whether processing of the request can be completed within the time allotment (e.g., within the timeout value). In some embodiments, the service may predict the amount of time to process the request by at least the service, compare the predicted amount of time to process the request to the remaining time allotment, and based on the comparison, determine whether to continue processing the request or fail the request. For example, if the remaining time is less than the predicted time, then the service determines to fail the request; otherwise, the service determines to continue processing the request. If processing of the request cannot be completed within the time allotment, then the service fails the request at block 506. At block 508, the service returns a failure response to the client device.

At block 504, if the service determines that processing of the request can be completed within the time allotment (e.g., within the timeout value), then at block 510, the service processes the request (e.g., performs a portion of the processing that is less than the entire portion of processing necessary to complete processing of the request). The processing may include any computations or other operations performed on data of the request and/or any functions performed by the service based on the request (e.g., based on instructions and/or data indicated by the request).

At block 512, after the service completes its portion of processing the request, the service determines whether processing of the request can be completed within the time allotment (e.g., within the timeout value). In some embodiments, the service may determine an amount of time that was used by the service to process the request and based on the amount of time that used by the service to process the request, determine whether to propagate the request to another service or fail the request. For example, the service may reduce the remaining time allotment (e.g., timeout value) based on the amount of time used by the service to process the request, and based on the reduced time allotment, determine whether to propagate the request to another service or fail the request. If the reduced time allotment is less than the a predicted amount of time to process the request by one or more additional service, then the service determines to fail the request; otherwise, the service determines to continue processing the request.

If processing of the request cannot be completed within the time allotment, then the service fails the request at block 514. At block 516, the service returns a failure response to the client device. At block 512, if the service determines to continue processing the request, then at block 518, the service propagates the request to the next service.

Figure 6:
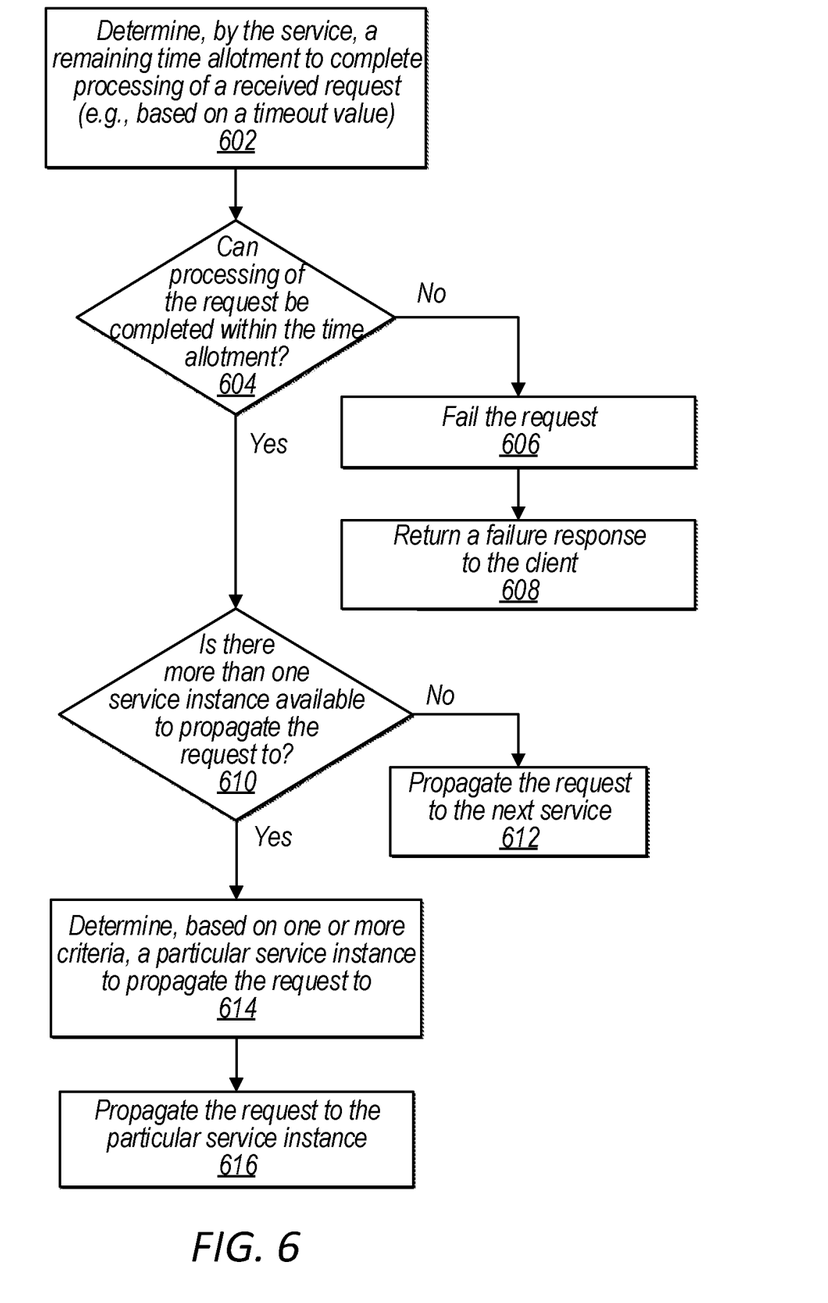
FIG. 6 is a flow diagram that illustrates selecting a particular service instance from multiple available instances to propagate a request to, according to some embodiments.

FIG. 6 is a flow diagram that illustrates selecting a particular service instance from multiple available instances to propagate a request to, according to some embodiments. At block 602, a service determines a remaining time allotment to complete processing of a request (e.g., based on a timeout value received by the service from the request and based on how long the service took to process the request).

At block 604, after the service completes its portion of processing the request, the service determines whether processing of the request can be completed within the time allotment (e.g., within the timeout value). In embodiments, the service may determine an amount of time that was used by the service to process the request and based on the amount of time that used by the service to process the request, determine whether to propagate the request to another service or fail the request. For example, the service may reduce the remaining time allotment (e.g., timeout value) based on the amount of time used by the service to process the request, and based on the reduced time allotment, determine whether to propagate the request to another service or fail the request. If the reduced time allotment is less than the a predicted amount of time to process the request by one or more additional service, then the service determines to fail the request; otherwise, the service determines to continue processing the request.

If processing of the request cannot be completed within the time allotment, then the service fails the request at block 606. At block 608, the service returns a failure response to the client device. At block 602, if the service determines to continue processing the request, then at block 610, the service determines if there is more than one service instance available to propagate the request to. If not, then at block 612 propagates the request to the next service.

At block 610, if the service determines there is more than one service instance available to propagate the request to, then at block 614, the service determines, based on one or more criteria, a particular service instance of the multiple instances as a target service instance to propagate the request to. For example, in some embodiments, the service determines which of the available instances will process the request in the shortest amount of time and selects the determined instance as the target service instance to propagate the request to (e.g., to lower latency for a request response and/or to reduce processing cost for the request). In embodiments, this will allow for the shortest possible response time for the request (for example, if the client that submitted the request needs to have the request processed faster than one or more other requests submitted by the same and/or other clients). In some embodiments, the service determines which of the available instances will process the request in the longest amount of time and selects the determined service instance as the target service to propagate the request to (e.g., if the latency for a request response or the processing cost for the request is not relevant or not important or not as important as for other requests). In embodiments, this will allow for other, faster services to be available to process other requests that require a faster processing time (e.g., services with a shorter time allotment).

In some embodiments, the service determines which of the available instances will take the longest time to process the request while still allowing completion of the request within a threshold amount of time or within the remaining time allotment (e.g., if the latency for a request response or the processing cost for the request is not as relevant or not as important as for other requests from the same client and/or other clients), and selects the determined instance as the target service to propagate the request to. In embodiments, this will allow for other, faster services to be available to process other requests for the same and/or other clients that require a faster processing time (e.g., services with a shorter time allotment). In embodiments, any combination of one or more suitable criteria may be used to determine a particular service instance of the multiple instances as a target service to propagate the request to. For example, a cost for using the service instance, a reliability of the service instance (e.g., based on a number of previously failed requests) and/or any of the above criteria may be used, At block 616, the service propagates the request to that particular service instance. In embodiments, this may allow faster instances to remain available to service other requests that may have a shorter remaining time allotment (e.g., timeout value), reducing the number of request timeouts and increasing speed and/or performance of applications.

In embodiments, some or all of the components of the services of the provider network may operate within the context of an event-driven execution environment. For example, one or more of the requests sent from a client device to a service of the provider network may be assigned to respective events, such that a particular service or function is triggered in response to detection, by the event-driven execution environment, of an event assigned to the particular service or function (e.g., receiving a request from a client device).

Any of various computer systems may be configured to implement processes associated with the provider network, model selection and deployment service, client network, hub device, or any other component of the above figures. For example, FIG. 7 is a block diagram illustrating an example computer system that implements some or all of the techniques described herein, according to some embodiments.

Figure 7:
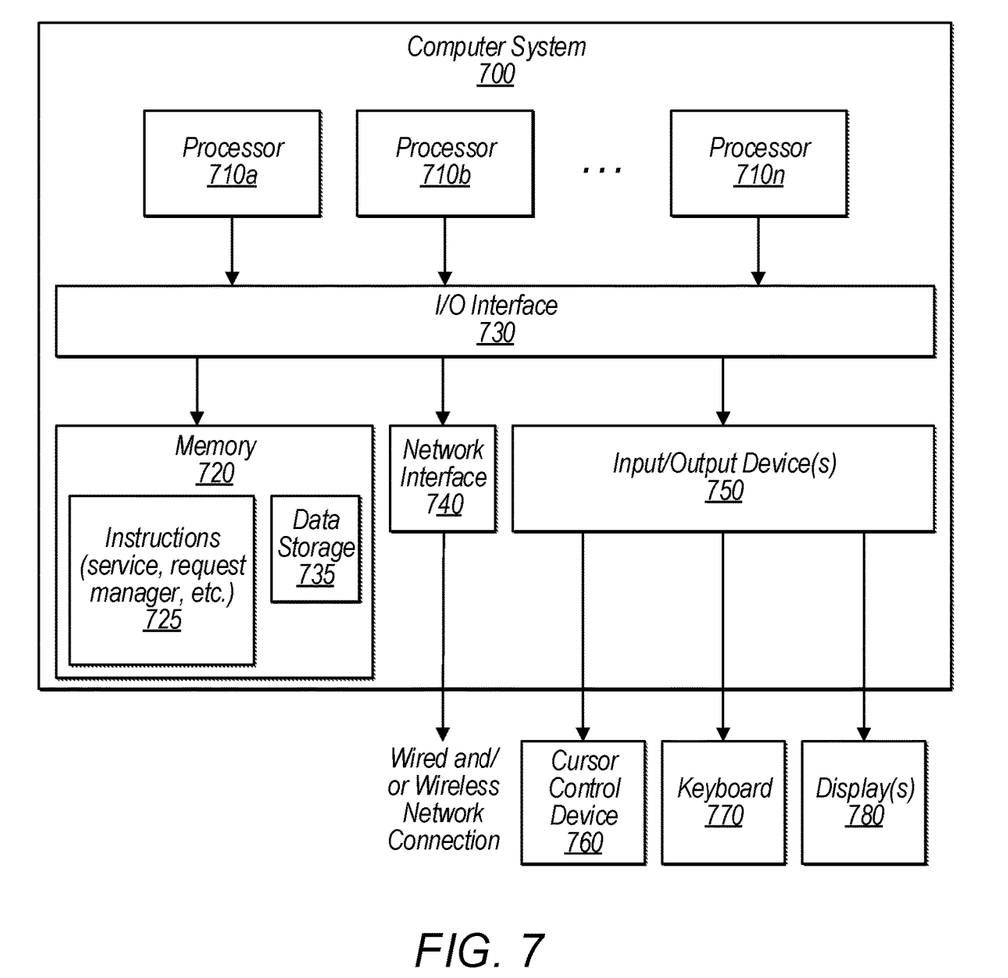
FIG. 7 is a block diagram illustrating an example computer system that implements some or all of the techniques described herein, according to some embodiments.

In various embodiments, the provider network or any other service/component of any of FIGS. 1-6 may each include one or more computer systems 700 such as that illustrated in FIG. 7. In embodiments, the provider network or any other component may include one or more components of the computer system 700 that function in a same or similar way as described for the computer system 700.

In the illustrated embodiment, computer system 700 includes one or more processors 710 coupled to a system memory 720 via an input/output (I/O) interface 730. Computer system 700 further includes a network interface 740 coupled to I/O interface 730. In some embodiments, computer system 700 may be illustrative of servers implementing enterprise logic or downloadable application, while in other embodiments servers may include more, fewer, or different elements than computer system 700.

In various embodiments, computer system 700 may be a uniprocessor system including one processor 710, or a multiprocessor system including several processors 710 (e.g., two, four, eight, or another suitable number). Processors 710 may be any suitable processors capable of executing instructions. For example, in various embodiments, processors 710 may be embedded processors implementing any of a variety of instruction set architectures (ISAs), such as the x106, PowerPC, SPARC, or MIPS ISAs, or any other suitable ISA. In multiprocessor systems, each of processors 710 may commonly, but not necessarily, implement the same ISA.

System memory 720 may be configured to store instructions and data accessible by processor 710. In various embodiments, system memory 720 may be implemented using any suitable memory technology, such as static random access memory (SRAM), synchronous dynamic RAM (SDRAM), non-volatile/Flash-type memory, or any other type of memory. In the illustrated embodiment, program instructions and data implementing desired functions, such as those methods and techniques described above for the provider network (e.g., the services) or client network (e.g., the devices) are shown stored within system memory 720 as program instructions 725. In some embodiments, system memory 720 may include data 735 which may be configured as described herein.

In one embodiment, I/O interface 730 may be configured to coordinate I/O traffic between processor 710, system memory 720 and any peripheral devices in the system, including through network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments, some or all of the functionality of I/O interface 730, such as an interface to system memory 720, may be incorporated directly into processor 710.

Network interface 740 may be configured to allow data to be exchanged between computer system 700 and other computer systems 700 or devices attached to a network, such as the local network discussed above, a wide-area network, or a local network within the provider network, for example. In particular, network interface 740 may be configured to allow communication between computer system 700 and/or various I/O devices 750. I/O devices 750 may include scanning devices, display devices, input devices and/or other communication devices, as described herein. Network interface 740 may commonly support one or more wireless networking protocols (e.g., Wi-Fi/IEEE 802.11, or another wireless networking standard). However, in various embodiments, network interface 740 may support communication via any suitable wired or wireless general data networks, such as other types of Ethernet networks, for example. Additionally, network interface 740 may support communication via telecommunications/telephony networks such as analog voice networks or digital fiber communications networks, via storage area networks such as Fibre Channel SANs, or via any other suitable type of network and/or protocol.

In some embodiments, system memory 720 may be one embodiment of a computer-accessible medium configured to store program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 700 via I/O interface 730. A computer-readable storage medium may also include any volatile or non-volatile media such as RAM (e.g. SDRAM, DDR SDRAM, RDRAM, SRAM, etc.), ROM, etc., that may be included in some embodiments of computer system 700 as system memory 720 or another type of memory. Further, a computer-accessible medium may include transmission media or signals such as electrical, electromagnetic, or digital signals, conveyed via a communication medium such as a network and/or a wireless link, such as may be implemented via network interface 740.

In some embodiments, I/O devices 750 may be relatively simple or "thin" client devices. For example, I/O devices 750 may be configured as dumb terminals with display, data entry and communications capabilities, but otherwise little computational functionality. However, in some embodiments, I/O devices 750 may be computer systems configured similarly to computer system 700, including one or more processors 710 and various other devices (though in some embodiments, a computer system 700 implementing an I/O device 750 may have somewhat different devices, or different classes of devices).

In various embodiments, I/O devices 750 (e.g., scanners or display devices and other communication devices) may include, but are not limited to, one or more of: handheld devices, devices worn by or attached to a person, and devices integrated into or mounted on any mobile or fixed equipment, according to various embodiments. I/O devices 750 may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 700. In general, an I/O device 750 (e.g., cursor control device 760, keyboard 770, or display(s) 780 may be any device that can communicate with elements of computing system 700.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein (e.g., the functionality of the services, databases, devices and/or other communication devices, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A system, comprising:
one or more processors; and
one or more memories, wherein the one or more memories have stored thereon instructions, which when executed by the one or more processors, cause the one or more processors to implement a plurality of services of a provider network, wherein individual ones of the services are configured to:
receive a request, wherein the request comprises a timeout value that indicates a remaining time allotment to complete processing of the request;
in response to reception of the request at the service, determine by the service, based at least on the timeout value of the request, the remaining time allotment that is available to complete processing of the request by at least the service;
determine an amount of time to process the request by at least the service;
determine, based on the remaining time allotment and the amount of time to process the request by at least the service, that the request will not be able to be completed within the remaining time allotment; and
in response to the determination that the request will not be able to be completed within the remaining time allotment, fail the request without further processing of the request to enable a retry of processing of the request sooner than if the request were further processed by at least the service.

2. The system as recited in claim 1, wherein to determine an amount of time to process the request by at least the service, the service is configured to:
generate a prediction of the amount of time to process the request by at least the service; and
wherein to determine whether to continue processing the request or fail the request, the service is configured to:
compare the predicted amount of time to process the request to the remaining time allotment to complete processing of the request; and
based on the comparison, determine whether to continue processing the request or fail the request.

3. The system as recited in claim 1, wherein to determine an amount of time to process the request by at least the service, the service is configured to:
determine the amount of time that was used by the service to process the request; and
wherein to determine whether to continue processing the request or fail the request, the service is configured to:
reduce the remaining time allotment based on the amount of time used by the service to process the request; and
based on the reduced time allotment, determine whether to propagate the request to another service or fail the request.

4. The system as recited in claim 1, wherein the service is configured to:
receive an additional request;
determine another remaining time allotment to complete processing of the additional request;
predict an amount of time to process the additional request by at least the service and another service;
determine, based on the other remaining time allotment and the predicted amount of time to process the request by at least the service and the other service, that the additional request will be able to be processed within the remaining time allotment; and
continue processing the request.

5. The system as recited in claim 1, wherein a different one of the services is configured to, prior to the receiving of the request by the service:
receive the request;
determine an initial time allotment to complete processing of the request; and
propagate the request to the service or to an additional one of the services, wherein the request comprises a timeout value based on the initial time allotment.

6. A method, comprising:
performing, by a service implemented by one or more computing devices:
receiving a request, wherein the request comprises a timeout value that indicates a remaining time allotment to complete processing of the request;
in response to receiving the request at the service, determining by the service, based at least on the timeout value of the request, the remaining time allotment that is available to complete processing of the request by at least the service;
determining an amount of time to process the request by at least the service;
determining, based on the remaining time allotment and the amount of time to process the request by at least the service, whether to continue processing the request or fail the request; and
in response to the determination of whether to continue processing or fail the request, continue processing the request or fail the request.

7. The method as recited in claim 6, wherein determining an amount of time to process the request by at least the service comprises:
generating a prediction of the amount of time to process the request by at least the service; and
wherein determining whether to continue processing the request or fail the request comprises:
comparing the predicted amount of time to process the request by at least the service to the remaining time allotment to complete processing of the request; and
based on the comparison, determining whether to continue processing the request or fail the request.

8. The method as recited in claim 7, further comprising:
determining an amount of time that was used by the service to process the request; and
based on the amount of time that used by the service to process the request, determining whether to propagate the request to another service or fail the request.

9. The method as recited in claim 8, further comprising:
reducing the timeout value based on the amount of time used by the service to process the request; and
based on the reduced timeout value, determining whether to propagate the request to the other service or fail the request.

10. The method as recited in claim 6, wherein determining an amount of time to process the request by at least the service comprises:
determining the amount of time that was used by the service to process the request; and wherein determining whether to continue processing the request or fail the request comprises:
  reducing the remaining time allotment based on the amount of time used by the service to process the request; and
  based on the reduced time allotment, determining whether to propagate the request to another service or fail the request.

11. The method as recited in claim 6, further comprising:
  receiving an additional request;
  determining another remaining time allotment to complete processing of the additional request;
  generating a prediction of an amount of time to process the additional request by at least the service and the other service; and
  determining, based on the other remaining time allotment and the predicted amount of time to process the request by at least the service and the other service, to fail the request.

12. The method as recited in claim 6, further comprising performing, by a different service implemented by the one or more computing devices:
  prior to the receiving of the request by the service:
    receiving the request;
    determining an initial time allotment to complete processing of the request; and
    propagating the request to the service or to an additional one of the services, wherein the request comprises a timeout value based on the initial time allotment.

13. The method as recited in claim 12, wherein determining the initial time allotment to complete processing of the request is based on one or more of:
  a configuration parameter specified for a user account,
  a configuration parameter included in the request,
  a type of the request,
  a source of the request, or
  a target of the request.

14. The method as recited in claim 6, further comprising:
  subsequent to propagating the request to another service, receiving a response from the other service indicating that processing of the request failed;
  determining an updated remaining time allotment to complete processing of the request; and
  based at least on the updated remaining time allotment, determining whether to retry the request or fail the request.

15. One or more non-transitory computer-accessible storage media storing program instructions that when executed on or across one or more processors cause the one or more processors to implement a service to:
  receive a request, wherein the request comprises a timeout value that indicates a remaining time allotment to complete processing of the request;
  in response to reception of the request at the service, determine by the service, based at least on the timeout value of the request, the remaining time allotment that is available to complete processing of the request by at least the service;
  determine an amount of time to process the request by at least the service;
  determine, based on the remaining time allotment and the amount of time to process the request by at least the service, whether to continue processing the request or fail the request; and
  in response to the determination of whether to continue processing or fail the request, continue processing the request or fail the request.

16. The one or more storage media as recited in claim 15, wherein to determine an amount of time to process the request by at least the service, the program instructions when executed on or across the one or more processors cause the one or more processors to:
  generate a prediction of the amount of time to process the request by at least the service; and
  wherein to determine whether to continue processing the request or fail the request, the program instructions when executed on or across the one or more processors cause the one or more processors to:
    compare the predicted amount of time to process the request by at least the service to the remaining time allotment to complete processing of the request; and
    based on the comparison, determine whether to continue processing the request or fail the request.

17. The one or more storage media as recited in claim 16, further comprising program instructions that when executed on or across the one or more processors cause the one or more processors to:
  determine an amount of time that was used by the service to process the request; and
  based on the amount of time that used by the service to process the request, determine whether to propagate the request to another service or fail the request.

18. The one or more storage media as recited in claim 15, wherein to determine an amount of time to process the request by at least the service, the program instructions when executed on or across the one or more processors cause the one or more processors to:
  determine the amount of time that was used by the service to process the request; and
  wherein to determine whether to continue processing the request or fail the request, the program instructions when executed on or across the one or more processors cause the one or more processors to:
    reduce the remaining time allotment based on the amount of time used by the service to process the request; and
    based on the reduced time allotment, determine whether to propagate the request to another service or fail the request.

19. The one or more storage media as recited in claim 15, further comprising program instructions that when executed on or across the one or more processors cause the one or more processors to:
  subsequent to propagating the request to another service, receive a response from the other service indicating that processing of the request failed;
  determine an updated remaining time allotment to complete processing of the request; and
  based at least on the updated remaining time allotment, determine whether to retry the request or fail the request.

20. The one or more storage media as recited in claim 15, wherein to determine, based on the remaining time allotment and the amount of time to process the request by at least the service, whether to continue processing the request or fail the request, the program instructions when executed on or across the one or more processors cause the one or more processors to:
  determine that there are a plurality of service instances available to propagate the request to;

determine, based on one or more criteria, a particular one of the service instances as a target service instance to propagate the request to; and propagate the request to the particular service instance.

* * * * *